Patented June 29, 1954

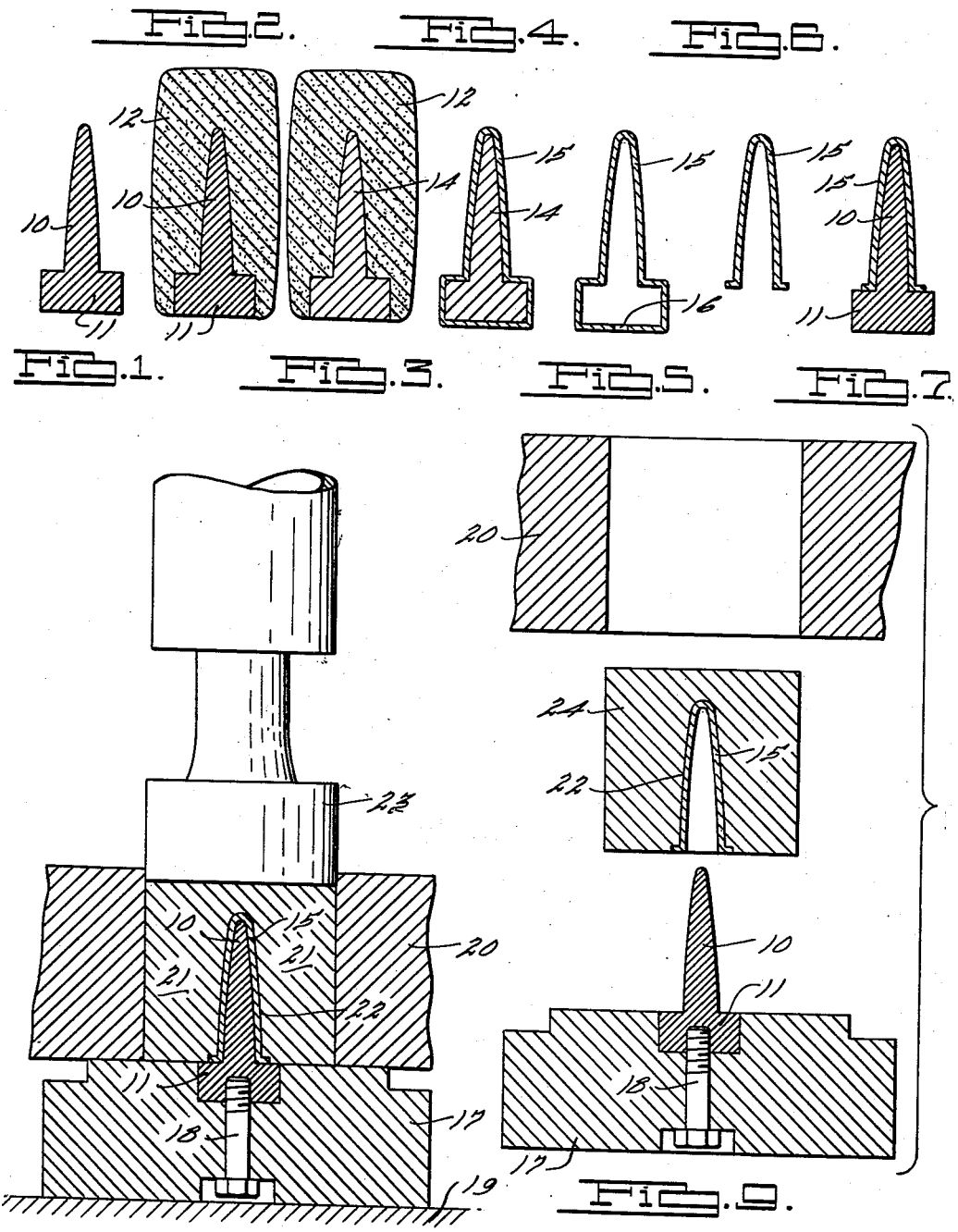

2,682,500

UNITED STATES PATENT OFFICE 2,682,500

PROCESS OF PREPARING PRESSURE
MOLDS AND DIES

Lawrence S. Tanner, Huntington Woods, Mich., assignor of one-half to Alfred Lindinger, Gratiot Township, Mich.

Application April 22, 1949, Serial No. 88,934

1 Claim. (Cl. 204—6)

This invention generally relates to molds and dies and particularly pertains to a new, novel and inventive article and method of making the article comprising an electro-deposited shell or shape forming the face of the mold or die and a backing surrounding the shell or shape which holds, supports and reinforces the shell and applied thereto under heat and pressure.

The article of the invention may be used in many fields of shaping, molding and forming such as synthetic resin injection molding, wire drawing, glass forming, natural resin molding, powder metallurgy, die casting, stamping, etc., where compression and pressure exerted against the die or mold forms and shapes the material being molded in conformance to the configuration of the face of the die or mold. For illustrative purposes synthetic resin injection molding is used to explain the use of the invention and its novelty and utility.

Several reasons favor the use of an electro-deposited shell negatively defining the article to be formed in the die or mold as the die or mold can be made quickly and much more cheaply compared to slow and expensive hand shaping. Also the wear resisting properties of the electro-deposited shell in the mold or die better resist the abrasive character or action of the materials being injected or compression molded. It is essential that the extremely hard mold be made in a manner which avoids hand shaping.

Electro-deposited shells for dies or molds can be made in several ways, one of which is hereinafter explained in detail, and several metals can be used in the electrolytic solution such as hard nickel, bright nickel, iron which is later carburized, chromium, etc., and it can be readily seen and appreciated that an extremely hard and dense shape can be quickly and cheaply formed which is accurate in all detail regardless of intricacy.

The cost of such shapes or shells is very important as tens and hundreds of cavities are sometimes required in the production of thousands and millions of parts. Other methods have been explored to obtain low cost accurate dies or molds such as hobbing in mild machine steel which is later hardened, casting directly in beryllium-copper, etc., but these methods do not produce a mold or die which is as hard and wear-resisting as required nor do they produce as accurate a shape or as finished a product as electro-depositing the mold face. Moreover, they are expensive.

However, a deposited shell has little tensile strength and is inclined to be brittle and it is essential to back up the shells to add strength in their area. Much difficulty, however, has been encountered in "backing" the shell which constitutes the face of the die or mold and heretofore several types of failures have resulted in the use of this type shell in conjunction with its "backing" or supporting medium.

Several methods of backing the electro-deposited shells have been employed to date such as building up the shell with electro-deposited copper which can then be machined and placed in a holder; or pouring a molten metal around the shell; both of which methods and the resulting tools are unsatisfactory due to the fact that in electroplating or depositing, the growth of the deposited metal is uneven in the outer layers as greater amounts are deposited in one area than in another resulting in what the trade calls "trees." Also, in corners, deposited metal has the tendency to bridge over and leave a cavity within the deposited shell. The trees create an area of weakness between the shell and the backing which has heretofore resulted in cracked and ruptured shells and a separation of the shell from the backing medium as the "trees" on the shell prevent the more dense particles of the metal from adhering to the shell thus allowing the less dense particles to become placed adjacent the shell which less dense particles give the shell least support and least reinforcement. The "trees" prevent the more dense particles from locating adjacent the shell.

Backing, bolstering, and holding the shell and its "backing" has heretofore presented a major difficulty as shells have "sunk" in their backing and/or their bolsters and a major problem in the art and industry of electro-deposited shells has been in not having a backing for the shells of any predetermined compressive strength. Heretofore the shells sink in the backing, the backing flows which allows the shell to tip and cant, or the backing to tilt and deform. In this regard the purpose to avoid hand shaping is defeated as great skill, time and cost is employed in hand setting and machining the shells with their backing, either gravity cast or deposited, into holders or bolsters which supply the main strength and resistance in the use of the tool, as, if set too loose in a holder, a shell would sink, and if set too tight, the shell would crack or rupture.

Thus we see that difficulty has been heretofore encountered and not overcome in joining the backing to the shell and in placing the backing in a bolster or holder. Failures have resulted not only between the shell and its "backing" but also between the backing and the die or mold holder or bolster. Moreover the backings themselves have been unsatisfactory as heretofore known backings have allowed the shells to sink therein and they have also deformed per se. These failures have impaired the success of the electro-deposited shell as a face portion for dies and molds.

It is therefore the general object of my invention to provide a shell and backing that overcomes the heretofore known difficulties and problems of the art and industry of electro-deposited shells constituting the faces of dies or molds employed in injection or compression molding.

An object of my invention is to provide a prestressed and pre-compressed electro-deposited shell for use as the face of a compression or injection molding die or mold.

An object of my invention is to provide a prestressed and compressed backing for such electro-deposited shell.

An object of my invention is to provide a prestressed and compressed junction, union or merger area between the shell and the backing.

An object of my invention is to pre-stress and compress the shell, backing and merger area of the shell and backing in excess of the amount of stress and compression to be exerted upon the shell, backing and merger area when used as a die or mold in compression or injection molding.

Another object of my invention is to pre-stress and pre-compress the shell, backing and the merger between them in a direction opposite to the direction of stress to be put upon the tool when it is used as a die or mold so that resistance is established in the tool to withstand the pressures incident to its use in compression or injection molding and to absorb any potential deformation.

A further object is to permeate the shell with heat and to compress the backing on said shell against the normal expansion of the shell due to its being heated.

A further object is to develope a grain in the shell, backing and merger of the shell and backing for strength purposes in the shell itself, the backing itself and in the merger area of the shell and backing per se.

A further object of the invention is to establish dense particles of backing adjacent to the shell among the "trees" of the electro-deposited shell thereby strongly merging the shell and the backing and positioning dense backing support in the area of greatest structural weakness of the shell.

These and other objects and advantages of the invention will be more apparent from the following description, the attached drawings and the appended claim.

In the drawings:

Fig. 1 is a vertical sectional view of a hob and base; the hob being shaped to the identity of the ultimate part to be produced, such as a fountain pen top.

Fig. 2 is a vertical sectional view showing the hob invested in a "stone," plaster or rubber cast.

Fig. 3 is a vertical sectional view showing the hob withdrawn from the investment and the cavity of the investment poured with a low melting alloy.

Fig. 4 is a vertical sectional view showing the low fusing alloy duplicate hob plated with a shell of hard nickel or other suitable material.

Fig. 5 is a vertical sectional view showing the shell tapped and the low fusing alloy emptied therefrom.

Fig. 6 is a vertical sectional view showing the shell prepared as a cavity for molding.

Fig. 7 is a vertical sectional view showing the prepared shell with the original hob positioned therein.

Fig. 8 is a vertical sectional view showing the hob and shell within a press, and Fig. 9 is a vertical sectional exploded view of backing retaining ring, the hob and block, and the shell embedded in backing.

For the purpose of simplicity a single cavity mold has been selected for describing the invention wherein positive replica or hob 10, Figs. 1, 2, 7, 8 and 9 is formed and shaped to the configuration of the product to be made in the die or mold and equipped with base 11 or other desirable or selected media for supporting the positive replica or hob 10. The hob 10 and base 11 may be unitary as shown or compiled of separate parts as deemed suitable.

The positive replica or hob 10, and if desirable, the base 11, is then invested or encased in plaster, "stone" or rubber 12, Fig. 2, and withdrawn therefrom after the plaster or "stone" has set leaving the impression of the positive replica or hob 10 therein, which impression is then poured or filled with a low temperature melting metal or alloy 14, Fig. 3, which, upon solidifying, is taken from the plaster 12. Here it may be noted that the configuration of the desired product and the positive replica or hob 10 are now cast in duplicate 14, and, if a multiple cavity die is desired, any number of duplicates 14 can be made by the use of the original positive replica or hob 10 and additional plaster 12.

The low-melting metal or alloy duplicate or duplicates 14 are then electro-plated by the use of known processes forming a shell 15, Figs. 4 to 9 of hard nickel, bright nickel, chromium, iron or other metal or alloy, and in the event that iron or similar material is used it is later carburized or otherwise hardened.

The duplicate 14 is then removed from within the shell 15 by heating the other alloy above its melting temperature and pouring it from the shell 15 via an orifice 16 or as otherwise desired such as by grinding the base off the shell 15 or preventing its formation thereon by known means such as reducing the size of the base of the duplicate 14 before it is plated and/or providing non-plating area thereon.

After the shell 15 has been prepared as finally desired, such as shown in Fig. 6, the positive replica 10 is inserted in the shell 15, Figs. 7 and 8, with the positive replica 10 mounted on block 17 by means of bolt 18 or other suitable means, and the block 17 placed on the bed 19 of a press, not fully shown. Retaining ring 20 or other suitable means is then positioned on the block 17 in spaced relation from the shell 15 seated on the hob 10. The area surrounding the shell 15 and the hob 10 within the retaining ring 20 above the block 17, is then poured and filled with molten metal 21 such as brass, bronze or beryllium-copper, or any other metal or alloy which creates a merger 22 with the shell 15 and, while the metal 21 is still molten, ram 23 enters the retaining ring 20 and places the molten metal 21, the shell 15, the merger area 22 and the duplicate replica 10 under an amount of pressure in excess of the amount of pressure to which the shell 15 will be subjected in use, and, after the molten metal 21, Fig. 8, has solidified it constitutes backing 24 as seen in Fig. 9. Immediately thereafter, the hob 10 is withdrawn from the shell 15 and the backing 24 pressed out of the retaining ring 20. The hob 10, block 17, ring 20 and ram 23 are coated with a medium such as grease or graphite to aid in separating the backing 24 and the shell 15 therefrom.

The pressure of the ram 23 on the molten metal 21 can either be lifted immediately after it has been applied or it can preferably be maintained until the molten metal 21 is solidified into the backing 24. It is preferable to maintain the pressure for a period during which the molten metal at least begins to solidify and, in practice, it has been found that the molten metal 21 solidifies very quickly under pressure due to the masses of metal with which it comes into contact, such as the block 17, the retaining ring 20, and the ram 23, and, it should be noted in this regard, that the shell 15 and its interiorly positioned hob 10 are in a central position which allows the shell to be permeated with heat to approximately the temperature of the molten metal 21. It is also true that when the shell is of a flat shape such as for a cameo or other flat object the shell outlining the cameo is positioned under the central area of the molten metal 21 so that the shell is always thoroughly permeated with heat. When the shell is permeated with heat it tends to expand, and as the pressure exerted on the shell by the backing tends to compress the shell, the backing and shell are urged toward one another and merge with one another creating an area of merger between them where the backing is forced into the rough and porous exterior of the deposited shell.

It is advisable that the shell 15 be supported when it is subjected to heat and pressure as an electro-deposited structure is brittle and does not usually have sufficient tensile strength to resist deformation under such circumstances. A hob 10 has been hereinbefore specified but any dense member having a complementary configuration to the face of the cavity is suitable to support the shell, such as a dense replica of the article to be formed in the die or mold.

While certain steps have been set forth to form the shell 15 such as making a rubber or plaster cast from the article or replica and using the cast to make a low-melting replica, any suitable and desirable manner or method can be employed to form a shell 15 by electro-deposition such as coating the hob 10 or dense replica with a thin layer of graphite, grease or carbon and electro-depositing directly thereon. The method set forth has been found desirable from the standpoint of easily removing the low melting metal from the shell without injuring or stressing the shell.

It has been also found that an extremely light flashing of copper on the back of the shell 15 is effective in aiding the merger area between the shell and the backing. This is especially true when the shell and backing are not conducive to merging such as when backing a chromium shell with ferrous material.

As has been hereinbefore mentioned the problem connected with electro-deposited cavities has been in holding, supporting and bolstering them so that they do not sink, or rupture; providing a backing that will not deform; and providing a merger between the backing and the shell which will not allow the shell and backing to separate resulting in the cumulative difficulties of the shell and backing as heretofore known.

As has been mentioned, the shell and backing are subjected to great pressure when the tool which they comprise is used in injection molding and compression molding with synthetic or natural resins, die casting, and powder metallurgy or stamping, and the pressures encountered are directed against the face of the shell, and transmitted via the body of the shell to the area of the merger of the shell with the backing, and again transmitted by the area of merger to the backing. It can readily be seen that the pressure is conducive to compress the shell, the backing, and the merger area between the shell and the backing resulting in failure of the tool due to the tool being proximate to the area of resistance when the tool is used, as the resistance or force furnished by the tool tends to not only compress the material being molded but also to compress the tool itself, which compression tends to force the shell into the backing, compress the merger area, and compress the backing, which stresses the tool and tends to deform same.

To offset the pressures encountered by the tool in molding the article by injection molding methods or compression molding methods, the tool of the invention is pre-compressed and pre-stressed in a direction opposite to the direction of the pressure encountered in using the tool.

This is accomplished by using the backing as a medium of compression while in its molten state to place the backing, the shell, and the merger area between the backing and the shell under an amount of pressure and compression in excess of the amount of pressure and compression to be encountered in the use of the tool and in a direction opposite to the direction that pressure and compression forces will be encountered in the use of the tool.

It is also to be noted that the dense particles of the molten backing material are urged into proximity with the shell regardless of the "trees" of deposited metal on the shell. While this accomplishes a mechanical union between the shell and the backing, it is more important that it urges dense particles into proximity with the shell so that the shell is more strongly supported by the backing than otherwise as the rough and porous exterior of the shell would allow only the less dense particles in their proximity without heat and pressure resulting in weak spots and cavities between the shell and backing.

Due to the fact that the shell, backing, and merger area are subjected to types of stresses and are subject to deformation of a permanent character therefrom it is essential that the tool be pre-stressed and compressed in a direction opposite to the direction of stress to be encountered in use. In use, the stress emanates from inside the cavity.

To accomplish pre-stressing, the tool of the invention is supported at the cavity face of the tool by the dense replica or hob and the backing, shell, and merger area between the shell and backing is stressed and compressed down and around the hob or dense replica. This direction of stress and compression is opposite to the stress and direction to be encountered in use and if the tool is subject to permanent deformation it will "deform" permanently around and about the hob or dense replica which anticipates the permanent deformation to which the tool would have been subject in use. The pre-stress emanates from outside the cavity and is directed toward the inside of the cavity.

In other words, when pressure is placed on the backing material, merger area, and shell, compressive strength is imparted to them so that they are capable of resisting the pressure which will be placed against the cavity when the tool is used in pressure molding and a greater amount of pounds per square inch can be pre-applied than will be encountered in use in a direction opposite to the force encountered in use to counteract same.

Due to the fact that the shell becomes hot in use it expands, and due to the fact that the backing is remote from the heat of use, it remains cooler than the shell. Heretofore this thermal difference has caused the shell to separate from the backing. However, as the backing in the invention is applied to the shell under heat and pressure with the shell being permeated with heat at high temperature, the shell is merged and united to the backing under heat and expansion and pressure conditions which anticipate the thermal difference between the shell and backing in use.

There is always a slight discrepancy between the negative replica and the positive replica due to human error, and non-perfection of all known methods of making the shell and hob; the shell may be slightly molded against the hob under heat and pressure to iron out their slight differences of contour and size as the heat reduces the brittleness of the shell and the pressure exerts the necessary forming force.

A single cavity mold has been illustrated and explained, but it is considered within the scope of the invention to pour the molten backing over a cluster of several shells at the same time thereby obtaining a multiple cavity die or mold in a common backing with each shell being supported by a dense replica.

As an example of the manner in which the method comprising this invention can be used, a shell 15 made from nickel and having a thickness of approximately $\frac{1}{16}$ inch may be formed by electro-deposition, as disclosed above. A flashing of copper having a thickness of approximately $1/64$ inch may be deposited on the back of the nickel shell 15. The backing 24 may be made from a suitable material such as iron.

Since iron has a melting point of approximately 1545° C. and copper has a melting point of approximately 1083° C., the backing 24 will tend to melt the copper flashing during the time that the iron is molten. Because of the melted condition of the copper and because of its active characteristics, the copper tends to facilitate the merger between the nickel shell 15 and the backing 24.

The merger is further facilitated because of the temperature of approximately 1455° C. at which nickel melts. Since nickel melts at a lower temperature than iron, some of the nickel contiguous to the copper flashing tends to melt and to flow, thereby producing a unitary juncture with the copper and the iron. Only the nickel adjacent the copper flashing tends to melt since the positive replica serves as a cold body to prevent the nickel adjacent the replica from melting.

During the time that the backing 24 is molten, pressure is applied to the backing in a direction to force the shell 15 against the positive replica 10. In the above example, a pressure of approximately 1800 pounds per square inch may be applied against the backing 24 when the mold formed by the shell 15 and the backing 24 is intended for use in injection molding to produce articles made from a polymer of methyl methacrylate. The pressure may be released after the shell material contiguous to the backing 24 has solidified and after the backing material contiguous to the shell 15 has also solidified. The pressure applied to the backing 24 also tends to produce some heat for melting the copper flashing and some of the nickel contiguous to the copper flashing.

In the above example, a material having a higher melting point than nickel may also be used for the shell 15. For example, chromium melting at a temperature of approximately 1545° C. may be used as the shell. Since chromium melts at a higher temperature than the iron in the backing 24, very little of the chromium tends to melt during the time that the iron is molten. In this case, an effective merger between the shell 15 and the backing 24 is obtained wholly by the action of the copper flashing and the pressure applied to the backing 24.

It should be appreciated that the above materials are intended only as examples. For example, other materials than nickel or chrome may be used for the shell 15 and other materials than iron may be used for the backing 24. Furthermore, the thickness of the materials in the above examples may vary. For example, the thickness of the shell 15 in the above example may vary between $\frac{1}{32}$ inch and $\frac{3}{32}$ inch and the thickness of the copper flashing may vary between $1/64$ inch and $\frac{1}{32}$ inch. The pressure applied to the backing 24 may also be considerably different from 1800 pounds per square inch if articles are to be made in the mold from a different material than a polymer of methyl methacrylate and a different process than injection molding.

Many changes, additions, deletions, and substitutions can be made in the invention without departing from its spirit or scope and the invention is limited only by the scope of the appended claim.

What is claimed:

The method of manufacturing a die for use in pressure molding where force or resistance is directed against the cavity of the die, comprising fabricating a replica of dense material having a face positively defining the part to be formed in the die, electro-depositing a shell of hard metal of the class consisting of nickel, iron, and chromium having a face negatively defining the part to be formed in the die and constituting the forming cavity of the die, depositing a flash coating of copper on the outside of said shell, positioning said shell on a replica with their negative and positive face portions respectively in mating relationship, pouring a molten metal of the class consisting of brass, bronze, beryllium-copper, and ferrous metal backing on the back of said shell, applying pressure on said molten metal backing, said shell, and the replica to create an area of merger between said backing and said shell and to force said backing against said heat expanded shell and said shell against the replica to stress said shell and backing toward the replica; releasing said pressure when said molten metal backing has solidified at least partially, and separating the replica from said shell and backing.

References Cited in the file of this patent

UNITED STATES PATENTS

| Number | Name | Date |
|---|---|---|
| 567,030 | Kelsey et al. | Sept. 1, 1896 |
| 630,771 | Blackwell, Jr. | Aug. 8, 1899 |
| 1,073,105 | Dunton | Sept. 16, 1913 |
| 1,082,058 | Wienand | Dec. 23, 1913 |
| 1,139,259 | Cottrell | May 11, 1915 |
| 1,164,079 | Dunton | Dec. 14, 1915 |
| 1,533,656 | Mullen | Apr. 14, 1925 |
| 1,615,474 | Midgley | Jan. 25, 1927 |
| 1,868,788 | Zinser | July 26, 1932 |
| 1,912,839 | Couse | June 6, 1933 |
| 2,119,056 | Peterson | May 31, 1938 |
| 2,182,775 | Abouchar | Dec. 12, 1939 |
| 2,195,499 | Schofield | Apr. 2, 1940 |

FOREIGN PATENTS

| Number | Country | Date |
|---|---|---|
| 118,797 | Australia | Aug. 24, 1944 |
| 421,892 | France | Jan. 4, 1911 |